(12) United States Patent
Ostino et al.

(10) Patent No.: US 11,773,727 B2
(45) Date of Patent: Oct. 3, 2023

(54) TURBINE BLADE COMPRISING THREE TYPES OF ORIFICES FOR COOLING THE TRAILING EDGE

(71) Applicant: SAFRAN AIRCRAFT ENGINES, Paris (FR)

(72) Inventors: Leandre Ostino, Moissy-Cramayel (FR); Filippo Pagnoni, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/906,226

(22) PCT Filed: Mar. 9, 2021

(86) PCT No.: PCT/FR2021/050392
§ 371 (c)(1),
(2) Date: Sep. 13, 2022

(87) PCT Pub. No.: WO2021/186121
PCT Pub. Date: Sep. 23, 2021

(65) Prior Publication Data
US 2023/0123944 A1    Apr. 20, 2023

(30) Foreign Application Priority Data

Mar. 18, 2020 (FR) ........................................ 2002664

(51) Int. Cl.
*F01D 5/18* (2006.01)
(52) U.S. Cl.
CPC .......... *F01D 5/18* (2013.01); *F05D 2240/304* (2013.01); *F05D 2240/305* (2013.01)

(58) Field of Classification Search
CPC ...... F01D 5/18; F01D 5/187; F05D 2240/304; F05D 2240/305; F05D 2260/202; Y02T 50/60
See application file for complete search history.

(56) References Cited

U.S. PATENT DOCUMENTS

2007/0048133 A1* 3/2007 Palmer ...................... F01D 5/20
                                                        416/97 R
2013/0232991 A1* 9/2013 Otero ...................... F01D 5/187
                                                        416/97 R (Continued)

FOREIGN PATENT DOCUMENTS

EP    2 685 049 A1    1/2014
EP    3 123 000 A1    2/2017

(Continued)

OTHER PUBLICATIONS

International Search Report dated May 26, 2021, in PCT/FR2021/050392 filed Mar. 9, 2021, citing documents 1-5 and 15-19, 3 pages (Continued)

*Primary Examiner* — Logan M Kraft
*Assistant Examiner* — Susan E Scharpf
(74) *Attorney, Agent, or Firm* — Oblon, McClelland, Maier & Neustadt, L.L.P.

(57) ABSTRACT

A blade of a turbomachine turbine, including a platform and a vane, including a cooling area extending along the trailing edge, with three distinct types of orifices, wherein the blade includes, at the root of the blade, a first type of orifices formed in the thickness of the trailing edge fillet, at the top of the blade, a third type of orifice formed in the thickness of at least one of the lower surface and upper surface walls, and in the middle of the blade, a second type of orifice formed in the thickness of at least one of the lower surface and upper surface walls. The lower surface wall, the upper (Continued)

surface wall and the trailing edge fillet define a dihedral with a radially changing radius and spacing.

10 Claims, 4 Drawing Sheets

(56) References Cited

U.S. PATENT DOCUMENTS

| | | | | |
|---|---|---|---|---|
| 2013/0243596 | A1* | 9/2013 | Quach | F01D 5/20 |
| | | | | 416/92 |
| 2013/0251539 | A1* | 9/2013 | Gautschi | F01D 5/187 |
| | | | | 416/97 R |
| 2013/0259645 | A1* | 10/2013 | Bergholz, Jr. | F01D 5/18 |
| | | | | 415/115 |
| 2014/0003962 | A1 | 1/2014 | Okita et al. | |
| 2014/0178198 | A1* | 6/2014 | Bluck | F01D 5/187 |
| | | | | 416/1 |
| 2016/0177740 | A1* | 6/2016 | Slavens | F23R 3/002 |
| | | | | 60/806 |
| 2017/0101872 | A1 | 4/2017 | Bregman | |
| 2017/0350256 | A1* | 12/2017 | Dutta | F01D 9/041 |
| 2018/0112533 | A1 | 4/2018 | Weber | |
| 2018/0202294 | A1* | 7/2018 | Spangler | F01D 5/18 |
| 2020/0182067 | A1 | 6/2020 | Dutta et al. | |
| 2021/0301666 | A1* | 9/2021 | Agudo | F02C 3/04 |

FOREIGN PATENT DOCUMENTS

| | | |
|---|---|---|
| EP | 3 255 245 A1 | 12/2017 |
| JP | 6-2502 A | 1/1994 |
| JP | 2002-221005 A | 8/2002 |

OTHER PUBLICATIONS

French Preliminary Search Report dated Dec. 2, 2020, in French Application No. 2002664 filed Mar. 18, 2020 (with English Translation of Categories of Cited Documents), citing documents 5 and 15-19 therein, 2 pages.

* cited by examiner

TURBINE BLADE COMPRISING THREE TYPES OF ORIFICES FOR COOLING THE TRAILING EDGE

TECHNICAL FIELD

The present invention relates to the general field of cooling turbomachine turbine blades, and more particularly to the field of cooling moving turbine blades for turbomachines.

The invention applies to any type of aeronautical or terrestrial turbomachines. It can in particular be applied to the moving turbine blades of aircraft turbomachines such as turbojets and turboprops, for example turbofan engines. It can also be applied to the moving blades of industrial gas turbines. The invention further preferably relates to the cooling of high pressure moving turbine blades, but also applies to the cooling of low pressure and/or intermediate pressure moving turbine blades.

PRIOR ART

In order to design increasingly efficient engines with reduced consumption, turbine blades have been developed that are increasingly reduced in size and resistant to increasingly high thermal and mechanical stresses such as temperature, pressure, rotational speed, among others.

It is indeed known that the blades of a turbomachine gas turbine, and in particular of the high pressure turbine, are subjected to the high temperatures of the combustion gases during the operation of the engine. These temperatures reach values that are far above those that the various parts that are in contact with these gases can withstand without damage, which has the effect of limiting their service life.

It is also known that a rise in the temperature of the gases of the high pressure turbine allows to improve the efficiency of a turbomachine, and therefore the ratio between the thrust of the engine and the weight of an airplane propelled by this turbomachine. Consequently, efforts have been made to produce turbine blades that can withstand higher and higher temperatures. In addition, the improvement of the turbine blades aims at reducing the fuel consumption of the engine.

One of the solutions that exist today to improve the blades, and in particular to improve the mechanical strength of the blades, is to reduce their operating temperature by making cooling more efficient. This cooling is obtained in particular by means of cooling circuits provided in the blades aiming at reducing the temperature of the latter. Thanks to such circuits, cooling air, which is generally introduced into the blade through its root, crosses the latter following a path formed by cavities made in the blade before being ejected through orifices (or drillings) opening at the surface of the blade, and in particular at the trailing edge of the blade. Improving the cooling circuit of a blade allows to reduce the air flow rate necessary for its cooling and also allows to increase the service life of the blades and/or to ensure that a service life objective is met in a context of increased temperature at the inlet of the turbine stage.

Moreover, the improvement of the blades is also made possible by the improvement of the aerodynamic profile in order to increase the efficiency of the blade.

Solutions have already been described in the prior art aiming at improving the cooling and the aerodynamic profile at the trailing edge of a moving blade of a high pressure turbine. By way of example, the French patent application FR 3 041 989 A1 discloses the cooling of the trailing edge of a high pressure turbine blade by means of three distinct cooling regions. French patent application FR 2 864 990 A1 describes solutions for improving cooling air discharge slots at the trailing edge of a high pressure turbine blade.

However, there remains a need to further improve the cooling efficiency at the trailing edge of a turbine blade, in particular to guarantee its mechanical strength, and to have an improved aerodynamic profile allowing to maximise the aerodynamic performance.

DESCRIPTION OF THE INVENTION

The purpose of the invention is therefore to at least partially overcome the needs mentioned above and the disadvantages relating to the embodiments of the prior art.

The object of the invention is thus, according to one of its aspects, a turbomachine turbine blade, intended to be mounted around an axis of rotation, including a platform, in particular an inner platform, and a vane extending in a radial direction relative to the axis of rotation, going from the inside to the outside away from the platform and ending in a top, the vane comprising a leading edge and a trailing edge, located downstream of the leading edge, and the vane comprising a lower surface wall and an upper surface wall each connecting the leading edge to the trailing edge, the lower surface wall and the upper surface wall being connected to each other at the trailing edge by a trailing edge fillet, characterised in that it includes, a cooling area which extends along the trailing edge, the cooling area comprising three distinct types of cooling orifices formed through the wall of the vane to allow the circulation of a cooling flow from the inside to the outside of the vane, these three types of cooling orifices being spaced from each other radially between the platform and the top, in that the blade includes, in the area at the root of the blade close to the platform, a first type of cooling orifices in the form of first cooling orifices formed in the thickness of the trailing edge fillet between the lower surface and upper surface walls, in that the blade includes, in the area at the top of the blade close to the top, a third type of cooling orifices in the form of third cooling orifices, distinct from the first orifices, formed in the thickness of the at least one of the lower surface and upper surface walls, in that the blade includes, in the area in the middle of the blade, located between the area at the root of the blade and the area at the top of the blade, a second type of cooling orifices in the form of second cooling orifices, distinct from the first orifices and from the third orifices, formed in the thickness of said at least one of the lower surface and upper surface walls, in that the cooling area of the trailing edge, the lower surface wall, the upper surface wall and the trailing edge fillet generally have the shape of a dihedral, the shape of which is characterised by the radius of the trailing edge fillet and the spacing, opposite the trailing edge, between the lower surface wall and the upper surface wall, and in that the spacing between the lower surface and upper surface and the radius of the trailing edge fillet are radially changing between the platform and the top of the blade.

In other words, the values of the spacing and the radius of the trailing edge fillet change in the radial direction. Thus, they are not constant over the entire height of the blade, between platform and top.

Thanks to the invention, it is possible to have a triple cooling configuration at the trailing edge of a turbine blade for a turbomachine and to obtain an improved aerodynamic profile of the blade. In particular, it is thus possible to reduce the fuel consumption of the turbine engine by reducing the flow rate necessary for cooling the blades, in particular the blades of a high pressure turbine, with the same service life as a turbine blade integrating a conventional cooling circuit. Furthermore, it is possible to increase the aerodynamic efficiency, in particular that of the high pressure turbine stage, by allowing to define a dihedral at the trailing edge with dimensions adapted according to the height, with respect to a blade incorporating a conventional trailing edge cooling technology. In addition, it is possible to increase the service life of the blades, in particular high pressure turbine blades, compared to blades integrating a conventional solution for cooling the trailing edge, for example slots at the trailing edge.

The turbine blade according to the invention may further include one or more of the following features taken individually or in any possible technical combination.

The second and third cooling orifices can preferably be formed in the thickness of the lower surface wall.

Moreover, the first, the second and the third cooling orifices can each include a different type of cooling orifice selected from drillings of cross-sectional circular shape, or of cross-sectional oblong shape, or in the shape of a slot.

In particular, the first cooling orifices may include drillings, in particular of cross-sectional circular and/or oblong shape, the second cooling orifices may include some of the cooling slots, in particular of cross-sectional rectangular or oblong shape, and drillings, in particular of cross-sectional circular shape, and the third cooling orifices may include the others of the cooling slots and of the drillings.

In particular, the first cooling orifices may include drillings, in particular of cross-sectional circular and/or oblong shape, the second cooling orifices may include cooling slots, in particular of cross-sectional rectangular or oblong shape, and the third cooling orifices may include drillings, in particular cross-sectional circular drillings.

Alternatively, the first cooling orifices may include drillings, in particular of cross-sectional circular and/or oblong shape, the second cooling orifices may include drillings, in particular of cross-sectional circular shape, and the third cooling orifices may include cooling slots, in particular of cross-sectional rectangular or oblong shape.

The first cooling orifices can preferably include drillings of cross-sectional circular shape. Their diameter can be comprised between 0.15 mm and 0.50 mm.

Furthermore, the radial pitch of the first orifices, corresponding to the radial dimension between two adjacent first orifices and measured from the centre of the outlet section of a first orifice to the centre of the outlet section of the first adjacent orifice, may be comprised between 1.5 and 5 times the radial dimension of a first orifice, in particular its diameter.

In addition, the radial height of the area at the root of the blade comprising the first cooling orifices may be less than or equal to 40%, in particular 20%, of the radial height of the vane, corresponding to the radial dimension of the vane between the platform and the top.

Moreover, the radial height of the area at the top of the blade comprising the third cooling orifices may be less than or equal to 30% of the radial height of the vane, corresponding to the radial dimension of the vane between the platform and the top.

Advantageously, the spacing between the lower surface and upper surface walls and the radius of the trailing edge fillet may increase radially going from the platform towards the top of the blade.

This spacing can be defined by the distance, or width of the dihedral, between the lower surface and upper surface walls at a predefined distance from the trailing edge, for example equal to 5 mm, or even 6 mm or else 7 mm.

Furthermore, the spacing between the lower surface and upper surface walls and the radius of the trailing edge fillet may preferably be greater in the area at the root of the blade than in the areas at the top of the blade and in the middle of the blade.

Moreover, the spacing between the lower and upper surfaces and the radius of the trailing edge fillet can be greater in the middle of the blade area than in the area at the top of the blade. Alternatively, the spacing between the lower and upper surface walls and the radius of the trailing edge fillet may be greater in the area at the top of the blade than in the area at the middle of the blade.

Preferably, the blade may be a moving blade for a moving turbine wheel for a turbomachine, in particular a high pressure turbine.

Moreover, another object of the invention, according to another of its aspects, is a turbine for a turbomachine, characterised in that it includes at least one moving wheel comprising a plurality of moving blades such as that defined previously, the turbine preferably being a high pressure turbine.

Furthermore, the object of the invention is additionally, according to another of its aspects, a turbomachine, characterised in that it includes at least one turbine as defined previously, the turbomachine preferably being a twin-spool turbomachine.

The blade, the turbine and the turbomachine according to the invention may include any one of the features stated in the description, taken in alone or according to any technically possible combination with other features.

BRIEF DESCRIPTION OF THE DRAWINGS

The invention can be better understood upon reading the detailed description which follows, of non-limiting examples of implementation thereof, as well as upon examining the schematic and partial figures, of the appended drawing, on which.

In all these figures, identical references may designate identical or similar elements.

In addition, the various portions shown in the figures are not necessarily shown on a uniform scale, to make the figures more readable.

DETAILED DESCRIPTION OF PARTICULAR EMBODIMENTS

Figure 1:
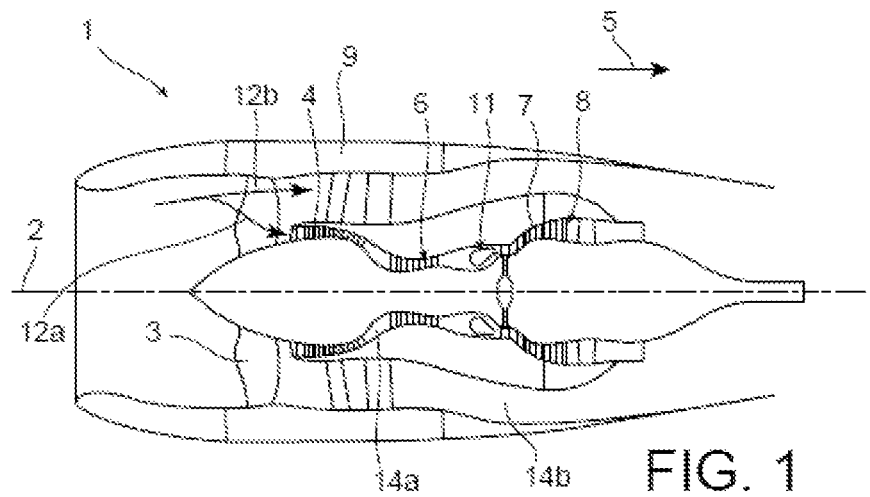
FIG. 1 is a schematic view in axial section of an example of a turbofan engine suitable for implementing the invention.

Throughout the description, it is noted that the axis 2 of the turbomachine 1 is referred to as the axis of radial symmetry of the latter (see FIG. 1). The axial direction of the turbomachine 1 corresponds to the axis of rotation 2 of the turbomachine 1. A radial direction of the turbomachine 1 is a direction perpendicular to the axis 2 of the turbomachine 1. Furthermore, unless otherwise specified, the adjectives and adverbs axial, radial, axially and radially are used with reference to the aforementioned axial and radial directions, and the terms inner (or internal) and outer (or external) are used with reference to a radial direction so that the inner portion of one element is closer to the axis 2 of the turbomachine 1 than the outer portion of the same element. In addition, it is noted that the terms upstream and downstream are to be considered relative to a main direction 5 of normal gas flow (from upstream to downstream) for the turbomachine 1.

FIG. 1 shows an aircraft turbomachine 1, for example here a turbofan and twin-spool turbojet engine, which has a central longitudinal axis 2 around which its various components extend. It comprises, from upstream to downstream along a main direction 5 of gas flow through this turbomachine, a fan 3, a low pressure compressor 4, a high pressure compressor 6, a combustion chamber 11, a high pressure turbine 7 and a low pressure turbine 8.

Conventionally, after passing through the fan, the air splits into a central primary flow 12a and a secondary flow 12b which surrounds the primary flow. The primary flow 12a flows in a main gas flow path 14a passing through the compressors 4, 6, the combustion chamber 11 and the turbines 7, 8. The secondary flow 12b, in turn, flows in a secondary flow path 14b delimited radially to the outside by an engine casing, surrounded by a nacelle 9.

Figure 2:
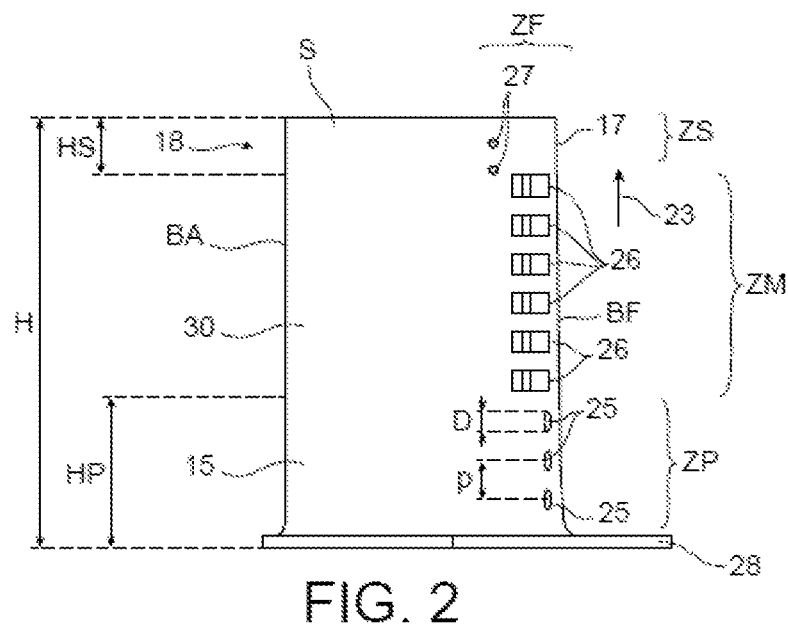
FIG. 2 shows, according to a partial side view, a first example of the trailing edge of a turbine blade in accordance with the invention.

Conventionally, the high pressure turbine 7 has alternating moving wheels and distributors. A distributor includes a plurality of fixed blades, and a moving wheel includes a plurality of moving blades 18, as shown in FIG. 2.

The moving blades 18 of the high pressure turbine 7 can mainly be cooled, at the trailing edge, through drillings made in the thickness of the trailing edge fillet or else through cooling slots.

Both of these cooling technologies have advantages and disadvantages. Thus, the drillings made in the thickness of the trailing edge fillet have a good compromise from a thermomechanical point of view. They ensure a controlled thermal level at the trailing edge. However, this requires defining a trailing edge of the aerodynamic profile that is relatively thick given the minimum thicknesses of material in this area, which then has an unfavourable effect on the aerodynamic efficiency of the aerodynamic profile. Furthermore, the slots at the trailing edge allow to define a relatively fine aerodynamic dihedral. From a thermomechanical point of view, however, they are less efficient than drillings emerging into the thickness of the trailing edge fillet. Indeed, the air emitted at the inlet of the trailing edge slots to cool the slot bottom by film heats up in contact with the air of the main flow path when traversing the slot bottom.

In order to improve the cooling at the trailing edge and to obtain an improved aerodynamic profile of the moving blade 18, the invention proposes to define a triple configuration for emitting the cooling air at the trailing edge associated with a dihedral at the trailing edge of the aerodynamic profile that is scalable according to the radial height, according to local thermomechanical needs and to maximise the aerodynamic efficiency.

FIG. 2 thus shows, according to a partial side view, a first example of cooling of the trailing edge BF of a moving blade 18 of a turbine in accordance with the invention, which can equip a high pressure turbine 7 of a turbojet engine 1 such as that of FIG. 1.

The blade 18 includes an inner platform 28 and a vane 30 extending in a radial direction 23, going from the inside to the outside away from the inner platform 28 and ending in a top S of the blade.

In addition, conventionally, the vane 30 comprises a leading edge BA and a trailing edge BF, located downstream of the leading edge BA. The vane 30 further comprises a lower surface wall 15 and an upper surface wall 16 each connecting the leading edge BA to the trailing edge BF, the lower surface wall 15 and the upper surface wall 16 being connected to each other at the trailing edge BF by a trailing edge fillet 17.

In accordance with the invention, the blade 18 includes a cooling area ZF which extends along the trailing edge BF, which comprises three distinct types of cooling orifices 25, 26, 27 formed through the wall of the vane 30 to allow the circulation of a cooling flow from the inside to the outside of the vane 30. These three types of cooling orifices 25, 26, 27 are spaced from each other radially between the inner platform 28 and the top S.

Thus, in the area at the root of the blade ZP close to the inner platform 28, which is a particularly critical mechanical area, the blade 18 includes a first type of cooling orifices 25 in the form of first cooling orifices 25 formed in the thickness of the trailing edge fillet 17 between the lower surface 15 and upper surface 16 walls.

These first orifices 25 are here made in the shape of drillings, preferably of cross-sectional circular shape, the orifices 25 then being preferably of cylindrical shape, or else of cross-sectional oblong shape as visible in FIG. 2. These first orifices 25 can have a larger radial dimension, in particular a diameter D, comprised between 0.15 mm and 0.50 mm. Moreover, the radial pitch p of these first orifices 25, corresponding to the radial dimension between two adjacent first orifices 25 and measured from the centre of the outlet section of a first orifice 25 to the centre of the outlet section of the first adjacent orifice 25, is comprised between 1.5 and 5 times the radial dimension D of a first orifice 25, in particular its diameter.

The production of these first orifices 25 allows, among other things, to ensure the presence of a large amount of metallic material. The radius R of the trailing edge fillet 17 is therefore large, and the spacing E of the dihedral DI is relatively thick, as will be described later with reference to FIGS. 4A and 5.

Furthermore, in the area at the top of the blade ZS close to the top S, the blade 18 includes a third type of cooling orifices 27 in the form of third cooling orifices 27, distinct from the first orifices 25, formed in the thickness of at least one of the lower surface 15 and upper surface 16 walls, and preferably here in the thickness of the lower surface wall 15.

These third cooling orifices 27 are here, in the example of FIG. 2, made in the shape of drillings, in particular of cross-sectional circular shape. They allow to define a radius R of the trailing edge fillet 17 that is as small as possible and a dihedral DI with a thin spacing E to improve aerodynamic efficiency, as explained later with reference to FIGS. 4C and 5.

Finally, in the area in the middle of the blade ZM, located between the area at the root of the blade ZP and the area at the top of the blade ZS, which is also a sensitive area from a thermomechanical point of view, the blade 18 includes a second type of cooling orifices 26 in the form of second cooling orifices 26, distinct from the first orifices 25 and from the third orifices 27, formed here in the thickness of the lower surface wall 15.

These second cooling orifices 26 are here, in the example of FIG. 2, in the shape of cooling slots, in particular of cross-sectional rectangular or oblong shape. These second cooling orifices 26 are located axially between the third orifices 27, upstream, and the first orifices 25, downstream. They allow to obtain a radius R of the trailing edge fillet 17 that is smaller than at the root of the blade and a dihedral DI with spacing E that is thinner than at the root of the blade.

Thanks to the invention, in addition to allowing the definition of an improved aerodynamic profile at the trailing edge fillet 17 and of the dihedral DI of the trailing edge, it is also possible to minimise the cooling rate used for cooling the trailing edge BF. In comparison with a conventional trailing edge cooled by slots over the entire radial height of the blade, the solution of the invention uses a lower cooling flow rate thanks to the presence in particular of simple drillings in the lower surface wall 15 in the area of the trailing edge BF the least constrained from a thermomechanical point of view.

Figure 3:
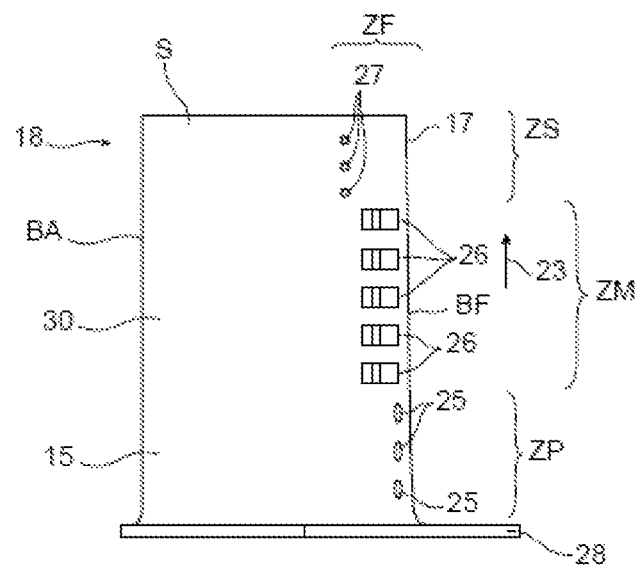
FIG. 3 shows, according to a partial side view, a second example of the trailing edge of a turbine blade in accordance with the invention.

In the first example of FIG. 2, the area at the top of the blade ZS includes two third cooling orifices 27. However, this number is variable. For example, FIG. 3 shows a second embodiment according to a view similar to that of FIG. 2 wherein three third cooling orifices 27 are present.

The best compromise between aerodynamic performance and thermomechanical behaviour can for example be obtained by integrating first cooling orifices 25, preferably in the shape of drillings, such as the radial height HP of the area at the root of the blade ZP comprising these first cooling orifices 25 is less than or equal to 20% of the radial height H of the vane 30, corresponding to the radial dimension of the vane 30 between the inner platform 28 and the top S, as shown in FIG. 2. In addition, the radial height HS of the area at the top of the blade ZS comprising the third cooling orifices 27, preferably in the shape of drillings, is then less than or equal to 30% of the radial height H of the vane 30.

Nevertheless, depending on the objective sought, it may be possible to modify this distribution. Thus, to significantly increase the service life of the vane 20, the range of the first orifices 25 can be increased up to 40% of the total height H of the vane 30, to the detriment of the aerodynamic performance.

Moreover, it should be noted that if the thickness of material is sufficient at the top of the blade ZS, the third orifices 27 may possibly comprise orifices including a first portion of cylindrical shape and a second portion of flared shape comprising divergent walls, thus similar to cooling orifices of the "fan-shaped hole" type, to maximise the cooling efficiency in the area.

FIGS. 4A, 4B, 4C and 5 further allow to illustrate the configuration of optimised aerodynamic profile obtained by means of the invention at the trailing edge BF of the moving blade 18 of the turbine.

Figure 4A:
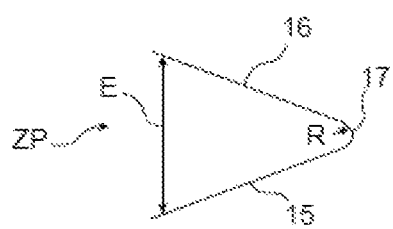
FIGS. 4A, 4B and 4C show respectively the section A at the top of the blade of the dihedral of FIG. 5, the section B at the middle of the blade of the dihedral of FIG. 5, and the section C at the root of the blade of the dihedral of FIG. 5.
Figure 4B:
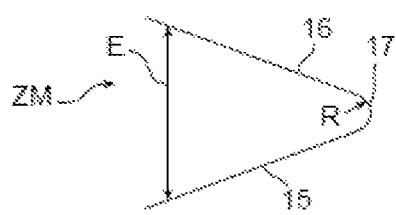
Figure 4C:
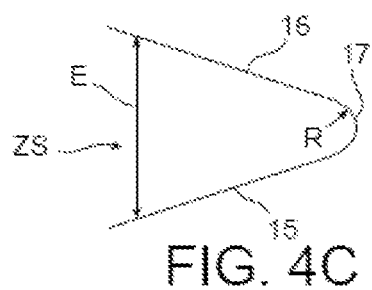
Figure 5:
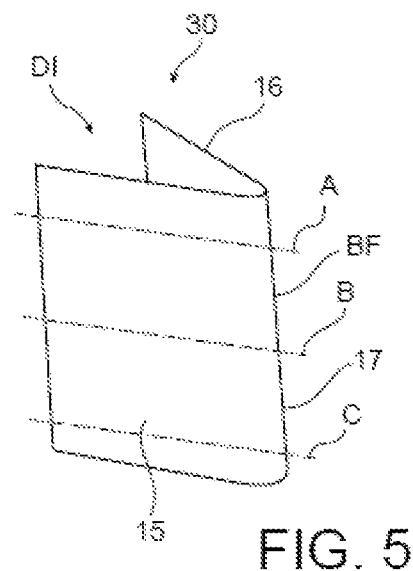
FIG. 5 shows, schematically in perspective, the dihedral obtained at the trailing edge of a turbine blade in accordance with the invention, formed by the planes of the lower surface and upper surface faces of the blade joined at the trailing edge through a trailing edge fillet.

Thus, the cooling area ZF of the trailing edge BF, the lower surface wall 15, the upper surface wall 16 and the trailing edge fillet 17 substantially together define a dihedral DI, generally having the shape of a dihedral DI, visible in FIG. 5, the shape of which is characterised by the radius R of the trailing edge fillet 17 and the spacing E, opposite the trailing edge BF, between the lower surface wall 15 and the upper surface wall 16, visible in FIGS. 4A, 4B and 4C. Advantageously, the spacing E between the lower surface 15 and upper surface 16 walls and the radius R of the trailing edge fillet 17 are radially changing between the inner platform 28 and the top S of the blade 18.

More specifically, in the area at the root of the blade ZP, as visible in FIG. 4A, the spacing E is thick and the value of the radius R is high. In particular, this spacing E between the lower surface 15 and upper surface 16 walls and the radius R of the trailing edge fillet 17 are greater in this area at the root of the blade ZP than in the areas at the top of the blade ZS and at the middle of the blade ZM.

In the area in the middle of the blade ZM, as visible in FIG. 4B, the dihedral DI is thinner and the value of the radius R is lower than at the root of the blade. Specifically, the spacing E between the lower surface 15 and upper surface 16 walls and the radius R of the trailing edge fillet 17 are greater in the area in the middle of the blade ZM than in the area at the top of the blade ZS.

Finally, in the area at the top of the blade ZS, as visible in FIG. 4C, the dihedral DI is thin and the value of the radius R is small.

Thus, compared to a reference aerodynamic profile drawn for a high pressure turbine blade cooled by slots at the trailing edge, the solution of the invention increases the radius R of the trailing edge fillet 17 from 30 to 100%, in the area at the root of the blade ZP, and decreases the radius R of the trailing edge fillet 17 by 10 to 50% in the area at the top of the blade ZS.

The solution of the invention can further be modulated according to the local thermomechanical situation of the blade 18 on which it is applied. For example, the number of second orifices 26, in particular in the shape of slots, in the middle of the blade can be adapted according to the value of the inlet temperature of the turbine of the engine on which the technology is applied, or else during a new conception or design following the performance of thermo-colouration or endurance tests of the turbine blade having led to the identification of local hot spots at the trailing edge.

If the turbine inlet temperature is relatively low, the number of second orifices 26, in particular in the shape of slots, can be reduced in favour of third orifices 27, in particular in the shape of drillings, which allow to define an aerodynamic dihedral DI which is finer, favourable for efficiency.

If, on the contrary, the turbine inlet temperature is relatively high, the number of second orifices 26, in particular in the shape of slots, can be increased to ensure a safe thermomechanical situation in the area, to the detriment of aerodynamic efficiency.

Figure 6:
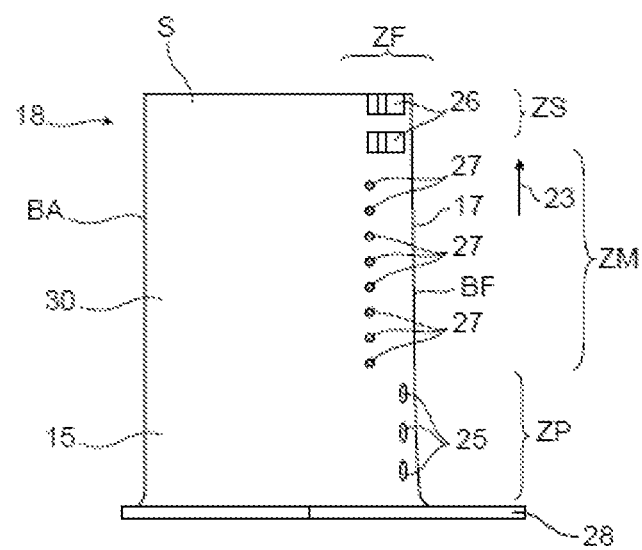
FIG. 6 shows, according to a partial side view, a third example of the trailing edge of a turbine blade in accordance with the invention.

In this case, the aerodynamic profile is thinner at the trailing edge BF, in terms of thickness of the dihedral DI and of the value of the radius R of the trailing edge fillet 17, in the middle of the blade ZM than at the top of the blade ZS. FIG. 6 thus shows a third embodiment of the blade 18 wherein the second orifices 26 are in the shape of circular drillings formed in the lower surface wall 15 and the third orifices 27 are in the shape of cooling slots. In this case, the spacing E between the lower surface 15 and upper surface 16 walls and the radius R of the trailing edge fillet 17 are greater in the area at the top of the blade ZS than in the area at the middle of the blade ZM.

Moreover, from the embodiment described previously with reference to FIG. 2, it is possible to determine an average value $V_{avg}$, a minimum value $V_{min}$ and a maximum value $V_{max}$ of radial evolution of the radius R of the trailing edge fillet 17. These values are determined for a case where the height HP represents 20% of the total height H of the blade while the height HS represents 30% of the total height H of the blade.

Figure 7:
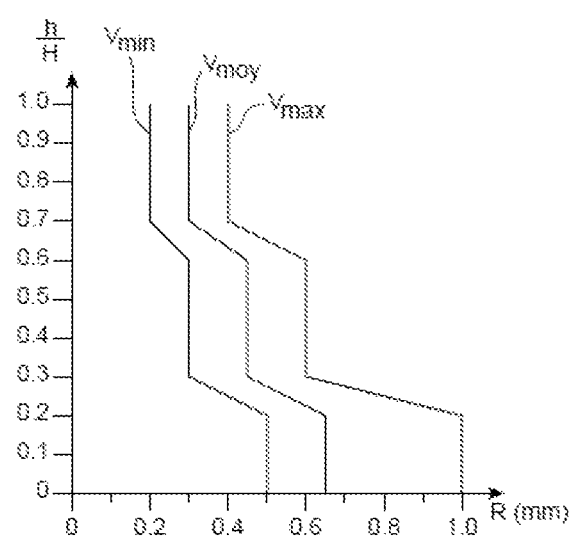
FIG. 7 illustrates, in graphical form, the radial evolution of the radius of the trailing edge fillet.

FIG. 7 shows the ratio h/H as a function of the radius R of the trailing edge fillet 17, where h corresponds to the radial height considered for observing the value of the radius R taken from the inner platform 28.

Moreover, the values $V_{min}$, $V_{avg}$ and $V_{max}$ obtained are shown in Table 1 below.

TABLE 1

Radial evolution of the value of the radius R of the trailing edge fillet

| h/H | $V_{min}$ (mm) | $V_{avg}$ (mm) | $V_{max}$ (mm) |
| --- | --- | --- | --- |
| 0 | 0.5 | 0.75 | 1 |
| 0.1 | 0.5 | 0.75 | 1 |
| 0.2 | 0.5 | 0.75 | 1 |
| 0.3 | 0.3 | 0.45 | 0.6 |
| 0.4 | 0.3 | 0.45 | 0.6 |
| 0.5 | 0.3 | 0.45 | 0.6 |
| 0.6 | 0.3 | 0.45 | 0.6 |
| 0.7 | 0.2 | 0.3 | 0.4 |
| 0.8 | 0.2 | 0.3 | 0.4 |
| 0.9 | 0.2 | 0.3 | 0.4 |
| 1 | 0.2 | 0.3 | 0.4 |

It can thus be seen that in the example of FIG. 2, the radius R decreases in the radial direction going from the inner platform 28 towards the top of the blade S, which allows to improve the efficiency.

Of course, the invention is not limited to the embodiments which have just been described. Various modifications can be made thereto by the person skilled in the art.

The invention claimed is:

1. A turbomachine turbine blade, intended to be mounted around an axis of rotation, including a platform and a vane extending in a radial direction relative to the axis of rotation, going from the inside to the outside away from the platform and ending in a top, the vane comprising a leading edge and a trailing edge, located downstream of the leading edge, and the vane comprising a lower surface wall and an upper surface wall each connecting the leading edge to the trailing edge, the lower surface wall and the upper surface wall being connected to each other at the trailing edge by a trailing edge fillet,
   wherein said blade includes a cooling area which extends along the trailing edge, the cooling area comprising three distinct types of cooling orifices formed through the wall of the vane to allow the circulation of a cooling flow from the inside to the outside of the vane, these three types of cooling orifices being spaced from each other radially between the platform and the top,
   wherein the blade includes, in the area at the root of the blade close to the platform, a first type of cooling orifices in the form of first cooling orifices formed in the thickness of the trailing edge fillet between the lower surface and upper surface walls,
   wherein the blade includes, in the area at the top of the blade close to the top, a third type of cooling orifices in the form of third cooling orifices, distinct from the first orifices, formed in the thickness of at least one of the lower surface and upper surface walls,
   wherein the blade includes, in the area in the middle of the blade, located between the area at the root of the blade and the area at the top of the blade, a second type of cooling orifices in the form of second cooling orifices, distinct from the first orifices and from the third orifices, formed in the thickness of said at least one of the lower surface and upper surface walls,
   wherein, the cooling area of the trailing edge, the lower surface wall, the upper surface wall and the trailing edge fillet have the shape of a dihedral the shape of which includes the radius of the trailing edge fillet and the spacing, opposite the trailing edge, between the lower surface wall and the upper surface wall, said spacing being defined by the distance between the lower surface and upper surface walls at a predefined distance from the trailing edge, and wherein the spacing between the lower surface and upper surface walls and the radius of the trailing edge fillet are radially changing between the platform and the top of the blade, the values of the spacing and the radius of the trailing edge fillet changing in the radial direction.

2. The blade according to claim 1, wherein the second and third cooling orifices are formed in the thickness of the lower surface wall.

3. The blade according to claim 1, wherein the first, the second and the third cooling orifices each include a different type of cooling orifice selected from drillings of cross-sectional circular shape, or of cross-sectional oblong shape, or in the shape of a slot.

4. The blade according to claim 1, wherein the radial height of the area at the root of the blade comprising the first cooling orifices is less than or equal to 40% of the radial height of the vane, corresponding to the radial dimension of the vane between the platform and the top.

5. The blade according to claim 1, wherein the radial height of the area at the top of the blade comprising the third cooling orifices is less than or equal to 30% of the radial height of the vane, corresponding to the radial dimension of the vane between the platform and the top.

6. The blade according to claim 1, wherein the spacing between the lower surface and upper surface walls and the radius of the trailing edge fillet are radially increasing from the platform to the top of the blade.

7. The blade according to claim 1, wherein the spacing between the lower surface and upper surface walls and the radius of the fillet trailing edge are greater in the area at the root of the blade than in the areas at the top of the blade and in the middle of the blade.

8. The blade according to claim 1, wherein the blade is a moving blade for a moving turbine wheel for a high pressure turbine.

9. A turbine for a turbomachine, including at least one moving wheel comprising a plurality of moving blades according to claim 1, the turbine being a high pressure turbine.

10. A turbomachine, including at least one turbine according to claim 9, the turbomachine being a twin-spool turbomachine.

* * * * *

UNITED STATES PATENT AND TRADEMARK OFFICE
CERTIFICATE OF CORRECTION

| | | |
|---|---|---|
| PATENT NO. | : 11,773,727 B2 | Page 1 of 1 |
| APPLICATION NO. | : 17/906226 | |
| DATED | : October 3, 2023 | |
| INVENTOR(S) | : Ostino et al. | |

It is certified that error appears in the above-identified patent and that said Letters Patent is hereby corrected as shown below:

In the Drawings

On sheet 4 of 4, FIG. 7, delete "$V_{moy}$" and insert -- $V_{avg}$ --, therefor.

Signed and Sealed this
Twenty-fifth Day of June, 2024

Katherine Kelly Vidal
*Director of the United States Patent and Trademark Office*